(12) United States Patent
Sode et al.

(10) Patent No.: US 11,837,732 B2
(45) Date of Patent: Dec. 5, 2023

(54) CARBON SHEET, GAS DIFFUSION ELECTRODE SUBSTRATE, AND FUEL CELL

(71) Applicant: TORAY INDUSTRIES, INC., Tokyo (JP)

(72) Inventors: Katsuya Sode, Otsu (JP); Takashi Chida, Otsu (JP); Toru Sugahara, Nagoya (JP); Michio Wakatabe, Otsu (JP); Masaru Hashimoto, Otsu (JP); Tetsuya Sunahara, Otsu (JP); Yuya Umezaki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 1331 days.

(21) Appl. No.: 15/778,839

(22) PCT Filed: Dec. 8, 2016

(86) PCT No.: PCT/JP2016/086580
§ 371 (c)(1),
(2) Date: Oct. 5, 2018

(87) PCT Pub. No.: WO2017/099181
PCT Pub. Date: Jun. 15, 2017

(65) Prior Publication Data
US 2019/0044153 A1    Feb. 7, 2019

(30) Foreign Application Priority Data

Dec. 11, 2015 (JP) .................................. 2015-241897
Dec. 11, 2015 (JP) .................................. 2015-241898

(51) Int. Cl.
*H01M 4/88*    (2006.01)
*H01M 4/96*    (2006.01)
(Continued)

(52) U.S. Cl.
CPC ........... *H01M 4/8807* (2013.01); *H01M 4/88* (2013.01); *H01M 4/96* (2013.01); *H01M 8/0234* (2013.01);
(Continued)

(58) Field of Classification Search
CPC ........ H01M 4/88; H01M 4/8807; H01M 4/96; H01M 8/0234; H01M 8/0245; H01M 8/10; H01M 8/1004; Y02E 60/50; Y02P 70/50
See application file for complete search history.

(56) References Cited

U.S. PATENT DOCUMENTS 9,825,304 B2    11/2017 Tatsuno et al.
2006/0166075 A1*  7/2006 Inoue .................. H01M 8/1004
                                                    429/450
(Continued)

FOREIGN PATENT DOCUMENTS

JP    2002352807 A      12/2002
JP    2004300601 A   *  10/2004
(Continued)

OTHER PUBLICATIONS

Machine translation of Japanese Patent Publication No. 2015/096464, published May 21, 2015. (Year: 2015).*
International Search Report and Written Opinion for International Application No. PCT/JP2016/086580, dated Jan. 10, 2017, 5 pages.

*Primary Examiner* — Miriam Stagg
*Assistant Examiner* — Lilia Nedialkova
(74) *Attorney, Agent, or Firm* — RatnerPrestia (57) ABSTRACT

A porous carbon sheet including at least carbon fibers, having a thickness of 30 to 95 μm, a gas permeation resistance of 0.5 to 8.8 Pa, and a tensile strength of 5 to 50 N/cm, and a gas diffusion electrode substrate including a porous carbon sheet containing at least carbon fibers, at least one surface thereof having a microporous layer containing at
(Continued)

least an electric conductive filler, the gas diffusion electrode substrate being dividable in the thickness direction into a smaller pore part and a larger pore part, the larger pore part having a thickness of 3 to 60 µm.

14 Claims, 1 Drawing Sheet

(51) Int. Cl.
*H01M 8/0234* (2016.01)
*H01M 8/0245* (2016.01)
*H01M 8/10* (2016.01)
*H01M 8/1004* (2016.01)

(52) U.S. Cl.
CPC ............ *H01M 8/0245* (2013.01); *H01M 8/10* (2013.01); *H01M 8/1004* (2013.01); *Y02P 70/50* (2015.11)

(56) References Cited

U.S. PATENT DOCUMENTS

2009/0258206 A1* 10/2009 Chida ................. D04H 1/4382
428/220
2014/0017589 A1 1/2014 Takami

FOREIGN PATENT DOCUMENTS

| | | |
|---|---|---|
| JP | 2007172953 A | 7/2007 |
| JP | 2008127661 A | 6/2008 |
| JP | 2008234968 A | 10/2008 |
| JP | 2010257748 A | 11/2010 |
| JP | 2012216365 A | 11/2012 |
| JP | 2013145640 A | 7/2013 |
| JP | 2014029873 A | 2/2014 |
| JP | 2014167173 A | 9/2014 |
| JP | 2015096464 A | 5/2015 |
| WO | 2007037084 A1 | 4/2007 |

* cited by examiner

CARBON SHEET, GAS DIFFUSION ELECTRODE SUBSTRATE, AND FUEL CELL

CROSS REFERENCE TO RELATED APPLICATIONS

This is the U.S. National Phase application of PCT/JP2016/086580, filed Dec. 8, 2016, which claims priority to Japanese Patent Application No. 2015-241897, filed Dec. 11, 2015, Japanese Patent Application No. 2015-241898, filed Dec. 11, 2015, the disclosures of these applications being incorporated herein by reference in their entireties for all purposes.

TECHNICAL FIELD OF THE INVENTION

The present invention relates to a carbon sheet which is suitably used in a fuel cell, particularly in a polymer electrolyte fuel cell; a gas diffusion electrode substrate containing a microporous layer; and a fuel cell including the gas diffusion electrode substrate.

BACKGROUND OF THE INVENTION

A polymer electrolyte fuel cell in which a hydrogen-containing fuel gas and oxygen-containing oxidizing gas are supplied to an anode and cathode, respectively, and an electromotive force is generated by an electrochemical reaction occurring at both poles is generally constituted by laminating a separator, a gas diffusion electrode substrate, a catalyst layer, an electrolyte membrane, a catalyst layer, a gas diffusion electrode substrate, and a separator in this order. The gas diffusion electrode substrate is required to have high gas diffusivity for allowing a gas supplied from the separator to be diffused into a catalyst layer and high water discharge performance for discharging water generated in the electrochemical reaction to the separator, as well as high electrical conductivity for extracting the generated electric current. Thus, gas diffusion electrode substrates are widely used in which a microporous layer is formed on a surface of a substrate that is a carbon sheet composed of a carbon fiber etc.

However, as problems of such gas diffusion electrode substrates, the following ones are known: (1) when the polymer electrolyte fuel cell is operated in a high electric current density region, fuel gas and oxygen gas are not supplied sufficiently to the catalyst layer, or when it is operated at a relatively low temperature of below 70° C. in a high current density region, the gas diffusion electrode substrate is blocked by liquid water generated in a large amount, resulting in shortage in the gas supply and deterioration in the fuel cell performance is impaired; and (2) when a thin or low-density carbon sheet is used in the gas electrode substrate with the aim of improving the gas diffusivity, the carbon sheet in the gas electrode substrate can be broken or suffer structural damage due to stretching in the fuel cell production process. In addition, there is another problem: (3) the micro porous layer suffers abrasion and damage during handling and as a result, the micro porous layer will come off as power generation is performed repeatedly, leading to a decrease in durability. In some cases, therefore, the gas diffusion electrode substrate is required to have resistance to abrasion as well as high gas diffusivity, generated water discharge performance, and mechanical strength.

Thus, for example, it has been proposed to mechanically produce through-pores of 100 to 400 μm in a carbon sheet to ensure easy movement of substances in the thickness direction of the carbon sheet (Patent document 1).

Another document has proposed a gas diffusion electrode substrate using a carbon sheet with a thickness of 20 to 400 μm (Patent document 2).

With respect to methods for producing carbon sheets, it has been known that when a precursor for a carbon sheet is continuously heat-pressed, it is effective to use a small unwinding tension (Patent document 3).

Another document has proposed a gas diffusion electrode substrate for fuel cells in which a microporous layer is formed in the interior and on one side of a carbon sheet (Patent document 4).

Another document has proposed a diffusion electrode in which a paint for a microporous layer is cast on a carbon sheet and heat-treated so that a microporous layer is formed over the entire carbon sheet or part of the carbon sheet (Patent document 5).

PATENT DOCUMENTS

Patent document 1: Japanese Unexamined Patent Publication (Kokai) No. 2008-234968
Patent document 2: Japanese Unexamined Patent Publication (Kokai) No. 2014-29873
Patent document 3: Japanese Unexamined Patent Publication (Kokai) No. 2015-96464
Patent document 4: Japanese Unexamined Patent Publication (Kokai) No. 2012-216365
Patent document 5: Japanese Unexamined Patent Publication (Kokai) No. 2008-127661

SUMMARY OF THE INVENTION

For the invention described in Patent document 1, however, through-pores are formed mechanically, leading to the problem of easy breakage due to stress concentration around the through-pores when a tensile stress is applied. Patent document 2 describes that the use of a carbon sheet with a small thickness is desirable for preventing deterioration in power generation characteristics, but no practical methods are shown for the production thereof, while for the invention described in Patent document 3, it is described that a small unwinding tension is desirable, but there is no quantitative description about its range.

For the invention described in Patent document 4, the larger pore part has a larger thickness and the generated water in the larger pore part tends to agglomerate to form large droplets, leading to the problem of deterioration in power generation characteristics. For the invention described in Patent document 5, furthermore, the thickness of the carbon sheet is too large to maintain a sufficiently high gas diffusivity required for power generation in a high electric current density region, and furthermore, there is no quantitative description about its range.

Thus, in view of the background regarding the conventional technology, an object of the present invention is to provide a carbon sheet suitable for use in a gas diffusion electrode substrate which can effectively prevent deterioration in power generation performance in the high electric current density region, which has been difficult conventionally, and in addition, can prevent damage and structural destruction during conveyance.

Another object of the present invention is to provide a gas diffusion electrode substrate including the above carbon sheet as a substrate, and a fuel cell including the gas diffusion electrode substrate.

Thus, in view of the background regarding the conventional technology, an object of the present invention is to provide a gas diffusion electrode substrate which can effectively prevent deterioration in power generation performance in the high electric current density region, which has been difficult conventionally, can prevent damage and structural destruction during conveyance, and has resistance to abrasion.

Still another object of the present invention is to provide a gas diffusion electrode substrate including the above carbon sheet as a substrate, and a fuel cell including the gas diffusion electrode substrate. Still another object is to provide a fuel cell including the gas diffusion electrode substrate.

A first embodiment of the present invention for solving the above-mentioned problems is as follows. Specifically, it is:

a porous carbon sheet including at least carbon fibers and having a thickness of 30 to 95 µm, a resistance to gas permeation of 0.5 to 8.8 Pa, and a tensile strength of 5 to 50 N/cm.

A second embodiment of the present invention is as follows. Specifically, it is:

a gas diffusion electrode substrate including a porous carbon sheet containing at least carbon fibers, at least one surface thereof having a microporous layer containing at least an electric conductive filler.

It may also be a gas diffusion electrode substrate as described above that can be divided in the thickness direction into a smaller pore part and a larger pore part, the larger pore part having a thickness of 3 to 60 µm.

According to the first embodiment of the present invention, it is possible is to provide a carbon sheet suitable for use in a gas diffusion electrode substrate which can effectively prevent deterioration in power generation performance in the high electric current density region, which has been difficult conventionally, and in addition, can prevent damage and structural destruction during conveyance.

According to the second embodiment of the present invention, it is possible is to provide a gas diffusion electrode substrate which can effectively prevent deterioration in power generation performance in the high electric current density region, which has been difficult conventionally, can prevent damage and structural destruction during conveyance, and has resistance to abrasion.

DETAILED DESCRIPTION OF EMBODIMENTS OF THE INVENTION

Figure 1:
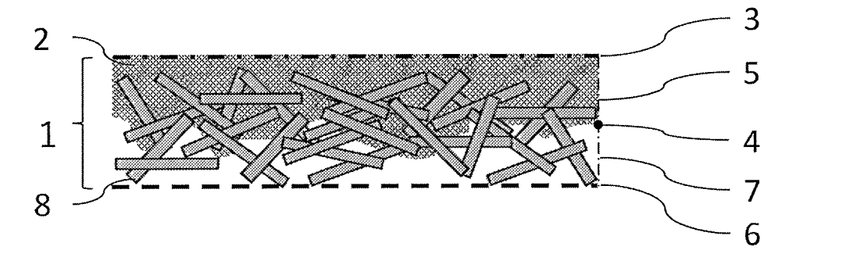
The FIGURE is a schematic sectional view for explaining the thickness of the smaller pore part and the thickness of the larger pore part of the gas diffusion electrode substrate according to the second embodiment of the present invention.

The first embodiment of the present invention provides a porous carbon sheet containing at least carbon fibers and having a thickness of 30 to 95 µm, a resistance to gas permeation of 0.5 to 8.8 Pa, and a tensile strength of 5 to 50 N/cm.

The second embodiment of the present invention provides a gas diffusion electrode substrate including a porous carbon sheet containing at least carbon fibers, at least one surface thereof having a microporous layer containing at least an electric conductive filler, the gas diffusion electrode substrate being able to be divided in the thickness direction into a smaller pore part and a larger pore part, the larger pore part having a thickness of 3 to 60 µm.

Hereinafter, the carbon sheet, a gas diffusion electrode substrate and a fuel cell contained in the gas diffusion electrode substrate according to the present invention will be described in detail.

[Carbon Sheet]

The carbon sheet used in the gas diffusion electrode substrate according to the present invention is a porous carbon sheet including at least carbon fibers and can be water repellent-finished as necessary.

For the present invention, the carbon sheet may also include a binding material. Here, a binding material is a components other than the carbon fibers in the carbon sheet. Thus, the binding material includes a carbide of a resin composition that serves to bind carbon fibers. When a water repellent material is used in the carbon sheet according to the present invention, that water repellent material is deemed as a binding material.

It is important for a gas diffusion electrode substrate to be highly electric conductive and porous and accordingly, the carbon sheet gas used in the diffusion electrode substrate according to the present invention, which is a porous carbon sheet containing at least carbon fibers, is preferably made of, for example, a porous material containing carbon fibers in the form of woven carbon fiber fabric, carbon paper, non-woven carbon fiber fabric, or the like, or a carbonaceous foamed porous material containing carbon fibers.

In particular, the carbon sheet adopted is preferably in the form of carbon paper composed mainly of carbon fiber based sheets bound with a carbide (binding material) because such a carbon sheet has high tensile strength required for its handling and good "spring properties", that is, the ability to absorb dimensional changes in the thickness direction of the electrolyte membrane.

According to a preferred embodiment, the carbon sheet gas used in the diffusion electrode substrate according to the resent invention is produced continuously in a roll-to-roll manner because production costs can be reduced.

It is preferable for the carbon sheet according to the present invention to have a thickness of 30 to 95 µm, a gas permeation resistance of 0.5 to 8.8 Pa, and a tensile strength of 5 to 50 N/cm.

If the carbon sheet used in the gas diffusion electrode substrate according to the resent invention has a gas permeation resistance of 8.8 Pa or less, the gas diffusivity will be high, ensuring good power generation characteristics in the high electric current density region. It is more preferably 8.0 Pa or less, and more preferably 7.0 Pa or less. If the carbon sheet has a gas permeation resistance of 0.5 Pa or more, on the other hand, its balance with the mechanical strength will be good in the carbon sheet.

The carbon sheet gas used in the diffusion electrode substrate according to the present invention can be conveyed without undergoing damage if the tensile strength of the carbon sheet at the maximum stress which is determined from destruction characteristics observation during stretching (stress-displacement curve) is 5 N/cm or more. The tensile strength is preferably 10 N/cm or more, and more preferably 15 N/cm or more. If it is 10 N/cm or more, a sufficiently high tension can be applied during conveyance to prevent the carbon sheet from slipping off, and if it is 15 N/cm or more, the sheet will be able to resist the impact from an increased conveyance speed, leading to an improved productivity. On the other hand, if the tensile strength of the carbon sheet is 50 N/cm or less, it will be well-balanced with the gas permeation resistance in the carbon sheet produced, and if it is 30 N/cm or less, furthermore, it will serve to achieve a very high gas permeation resistance.

For the carbon sheet used in the gas diffusion electrode substrate according to the present invention, the elongation percentage (%) at the maximum tensile strength, which is calculated by measuring the displacement at the maximum stress determined from destruction characteristics observation during stretching of the carbon sheet (stress-displacement curve), dividing it by the original length of the carbon sheet (60.0 mm), and multiplying the quotient by 100, is preferably 10% or less. If the elongation percentage (%) at the maximum tensile strength is 10% or less, stretching of the carbon sheet during conveyance, which will cause deformation of the porous structure, can be prevented. If it is 3% or less, furthermore, longitudinal creases that may occur under applied tension can be prevented effectively. There are no specific lower limits on the elongation percentage at the maximum tensile strength, but smooth conveyance will be ensure if it is 0.05% or more.

For the carbon sheet used in the gas diffusion electrode substrate according to the present invention, furthermore, it is preferable for the total area of the through-pores in the carbon sheet measured by the method described later to account for 7 to 40% of the total area of the carbon sheet, which account for 100%. If the carbon sheet have through-pores, they will serve for quick discharge of the generated water. The anti-flooding characteristic will improve if the total area of the through-pores account for 7% or more, and they will improve noticeably if it is 14% or more. If it is 40% or less, it will be well-balanced with mechanical characteristics. Good through-pore formation methods include the method of selecting an appropriate material for the carbon sheet and the method of forming pores in the carbon sheet by a mechanical technique, of which the method of selecting an appropriate material for the carbon sheet is preferable because good mechanical characteristics can be achieved. Specifically, in the pore size distribution in the carbon sheet, it is preferable that pores are continuously distributed instead of existence of individual pores in a particular size range. When equipment is operated at a relatively low temperature or in the high current density region, the gas diffusion electrode substrate is blocked by the water resulting in a large amount from power generation and a shortage in gas supply occurs to cause a decrease in power generation performance. The ability to resist this is referred to as anti-flooding characteristic.

Regarding the through-pores in the carbon sheet whose size is measured by the method described later, it is preferable for the carbon sheet used in the gas diffusion electrode substrate according to the present invention to contain such pores with a size of 25 µm or more at a rate of 5 pores/mm$^2$. The anti-flooding characteristic will be high if through-pores with a pore size of 25 µm or more exist at a rate of 5 pores/mm$^2$ or more, and it will be noticeably high if the rate is 15 pores/mm$^2$ or more, indicating that it is more preferable for the through-pores with a pore size of 25 µm or more to exist at a rate of 15 pores/mm$^2$ or more. There are no specific limitations on the upper limit of the through-pores with a pore size of 25 µm or more, but it will be well-balanced with mechanical characteristics if the rate is 500 pores/mm$^2$ or less.

It is preferable for the carbon sheet used in the gas diffusion electrode substrate according to the present invention to have a thickness of 30 µm or more and 95 µm or less, more preferably 40 µm or more and 85 µm or less. If the carbon sheet has a small thickness of 95 µm or less, gas diffusivity will be enhanced and the generated water will be discharged easily. It is preferable also because the size of a fuel cell as a whole will decrease. On the other hand, the thickness of the carbon sheet is preferably 30 µm or more. This is because if it is 30 µm or more, there will exist a sufficient number of carbon fibers per unit thickness to permit conveyance of carbon sheets in the form of rolls.

As described later in relation to the carbon sheet production method, a carbon sheet with a thickness of 30 µm or more and 95 µm or less can be obtained by controlling the areal weight of the carbon fiber, the amount of the resin component adhered to the carbon fiber, the thickness of the prepreg after the heat-pressing step, and the method used for the heat-pressing step.

For the present invention, the density of the carbon sheet used in the gas diffusion electrode substrate is preferably 0.20 to 0.40 g/m$^3$ and more preferably 0.22 to 0.35 g/m$^3$. When the density is 0.20 g/cm$^3$ or more, the mechanical characteristics of the carbon sheet are improved to allow the electrolyte membrane and the catalyst layer to be supported sufficiently and also to permit an increase in electric conductivity to ensure improved power generation performance. On the other hand, when the density is 0.40 g/cm$^3$ or less, water discharge performance is improved, and flooding can be suppressed.

As described later in relation to the carbon sheet production method, a carbon sheet with a density of 0.20 to 0.40 g/cm$^3$ can be obtained by controlling the areal weight of the carbon fiber, the amount of the resin component adhered to the carbon fiber, and the thickness of the carbon sheet. Here, the density of the carbon sheet can be determined by dividing the areal weight (mass per unit area) of the carbon sheet, which is measured using an electronic balance, by the thickness of the carbon sheet pressed under a pressure of 0.15 MPa. For the present invention, the binding material is one that serves to bind carbon fibers, and examples thereof include resin compositions and carbides thereof.

The carbon sheet used in the gas diffusion electrode substrate according to the present invention can serve as a gas diffusion electrode substrate having, at least on one surface thereof, a microporous layer containing at least an electric conductive filler.

A method suitable for producing the carbon sheet used in the gas diffusion electrode substrate according to the present invention will now be described in detail by taking a carbon paper, which includes paper-like carbon fiber as the porous component, as a representative example.

<Porous Material>

Examples of the carbon fiber include polyacrylonitrile (PAN) based, pitch based, and rayon based carbon fibers. In particular, PAN based carbon fiber or pitch based carbon fiber is preferably used for the present invention because of their high mechanical strength. It may also be appropriate to use flameproofed yarns that can be converted into carbon fibers by carbonization treatment, which will be described later.

In the carbon sheet used in the gas diffusion electrode substrate according to the present invention and in the porous material, such as paper-like one, used to produce the carbon sheet, the carbon fibers contained preferably have an average monofilament diameter in the range of 3 to 20 µm, more preferably in the range of 5 to 10 µm. If the average monofilament diameter is 3 µm or more, the pore diameter will be large enough to ensure improvement in water discharge performance and suppression of flooding. On the other hand, if the average monofilament diameter is 20 µm or less, the thickness of the carbon sheet is easily adjusted to the preferred range described below.

In the carbon fiber to be used in the present invention, the average monofilament length is preferably in the range of 3 to 20 mm, more preferably in the range of 5 to 15 mm. When the average monofilament length is 3 mm or more, the carbon sheet attains high mechanical strength, electrical conductivity, and thermal conductivity. On the other hand, when average monofilament length is 20 mm or less, dispersibility of the carbon fibers in the papermaking step is improved so that a uniform carbon sheet can be obtained.

It is preferable to minimize the quantity of non-carbon fibrous substances as the fibrous substance component in the porous material or it is preferable to use carbon fibers alone as the fibrous substance component in the porous material, because it will be easy to form through-pores with a pore size of 25 μm or more in the resulting carbon sheet.

The carbon fiber-containing porous material used for the present invention may contain pulp or synthetic fibers, and the inclusion of natural pulp such as wood pulp, bagasse pulp, and straw pulp will work to improve the tensile characteristics, although the formation of through-pores tends to be impeded.

The average diameter and average length of monofilaments in the carbon fiber are usually determined by directly observing the carbon fiber in the raw carbon fiber material, but they can be determined by observing the carbon sheet.

The paper-like carbon fiber substrate formed by a papermaking process, which is a form of porous material to be used for producing the carbon sheet, is preferably a sheet-like one in which carbon fibers are randomly dispersed in a two dimensional plane so that the in-plane electrical conductivity and thermal conductivity are maintained isotropic. The papermaking step for carbon fibers used to produce the paper-like carbon fiber substrate may be performed only once or performed multiple times to form a laminate.

<Impregnation with Resin Composition>

To produce the carbon sheet used in the gas diffusion electrode substrate according to the present invention, a porous material containing carbon fibers, such as paper-like carbon fiber substrate, is impregnated with a resin composition that serves as a binding material.

Good methods for impregnating a porous material containing carbon fibers with a resin composition used as a binding material include a method in which a porous material is dipped in a solution containing a resin composition, a method in which a porous material is coated with a solution containing a resin composition, and a method in which lamination and bonding of a film of a resin composition with a porous material is performed. In particular, the method of dipping a porous material in a solution containing a resin composition is preferably adopted because of its high productivity. A carbon fiber-containing porous material impregnated with a resin composition that serves as a binding material is referred to herein as "prepreg".

A resin composition is composed mainly of resin components, but may contain an additive as required.

The resin composition to be adopted for the production of a prepreg is preferably one that can be carbonized when baking to form an electrically conductive carbide that serves as binding material, and may contain an additive such as carbon powder and surfactant as required.

Good resin components for a resin composition used to produce a prepreg includes thermosetting resins such as phenolic resins, epoxy resins, melamine resins, and furan resins. Of these, phenolic resins are used preferably because of their high carbonization yield.

Such additives to be added to a resin composition as required include carbon powder, which may be adopted in order to produce a carbon sheet with improved mechanical properties, electrical conductivity, and thermal conductivity. Here, examples of the carbon powder include carbon black materials such as furnace black, acetylene black, lamp black, or thermal black; graphite materials such as scaly graphite, scale-like graphite, earthy graphite, artificial graphite, expanded graphite, and flaky graphite; and others such as carbon nanotube, linear carbon, and milled carbon fiber.

To provide a resin composition to be used for producing a prepreg, the resin composition as-obtained according to the above constitution may be adopted, or various solvents may be added for the purpose of improving the suitability of impregnation of a porous material such as paper-like carbon fiber substrate. Here, examples of such solvents include methanol, ethanol, and isopropyl alcohol.

When performing impregnation with a resin composition, it is preferable for the resin components to account for 30 to 400 parts by mass, more preferably 50 to 300 parts by mass, relative to 100 parts by mass of the carbon fibers in the prepreg. If the resin component accounts for 30 parts by mass or more relative to 100 parts by mass of the carbon fibers in the prepreg, the resulting carbon sheet will have excellent mechanical properties, electrical conductivity, and thermal conductivity. If the resin component accounts for 400 parts by mass or less relative to 100 parts by mass of the carbon fibers in the prepreg, the resulting carbon will have excellent gas diffusivity in the thickness direction, and if it accounts for 200 parts by mass or less, the total area of the through-pores in the resulting carbon sheet will increase, which is more preferable.

<Combining and Heat-Pressing>

For the present invention, after prepreg is prepared by impregnating a porous material such as paper-like carbon fiber with a resin composition, plies of such prepreg may be combined together or heat-treated before they are subjected to a carbonization step. If a heat-pressing step is adopted, such heat-pressing may be performed for a porous material that does not contain a resin composition.

For the present invention, a plurality of prepreg plies can be combined in order to produce a carbon sheet with a required thickness. In this case, a plurality of prepreg plies having the same properties may be combined, or a plurality of prepreg plies having different properties may be combined. Specifically, it is possible to combine a plurality of prepreg plies that are different in terms of the average diameter or average length of the monofilaments in the carbon fibers, the areal weight of the carbon fibers in the porous material, such as paper-like carbon fiber substrate, to be used for preparing the prepreg, the degree of impregnation with the resin component, or the like.

However, the strength of the entire prepreg decreases if it contains a plurality of prepreg plies, and it is desirable for the present invention that one individual sheet of porous material, such as paper-like carbon fiber substrate, is adopted, instead of combining plies thereof, and subjected to a heat-pressing step.

Such heat-pressing of a prepreg works to increase the viscosity of the resin composition in the prepreg and cause partial crosslinking, making it possible to produce a carbon sheet having an appropriately controlled thickness and density. In the heat-pressing step, hot-air heating may be performed additionally to help the heat treatment with the aim of enhancing the viscosity increase of the resin composition and crosslinking in the prepreg. Useful heat-pressing methods include the use of heated heat plates, rollers, or belts for pressing. Continuous heat-pressing of a prepreg can be achieved by providing unwinding and winding apparatuses before and after the heat-pressing apparatus.

Such continuous heat-pressing of a prepreg is commonly performed by applying an unwinding tension externally to achieve the treatment while preventing the prepreg from suffering from creases. In the production process for the carbon sheet according to the present invention, the unwinding tension in the heat-pressing step is preferably 0.05 N/cm or less. Here, the unwinding tension is the sum of the tension applied externally to the prepreg, which is referred to as external tension, and the tension resulting from the weight of the prepreg itself.

If a prepreg of the carbon sheet according to the present invention is heat-pressed while applying an external tension, damage may occur as carbon fibers are pulled off when the resin composition adhering the carbon fibers is melted. When a double belt pressing apparatus is used, for example, the portion that is sandwiched between the belts receives little tension to prevent the belt-sandwiched portion of the prepreg from rupturing, but if an external tension exists, damage of the prepreg can occur at the point preheated by the belts immediately before being pressed between the belts. If a method that uses a pair of parallel heating plates that performs for intermittent heat-pressing during conveyance is adopted, damage can occur not only in the portion preheated by the heating plates immediately before the start of pressing, but also in the portion interposed between the heating plates. However, if the external tension is zero while the tension from the weight of the prepreg is 0.05 N/cm or less in the unwinding tension in the heat-pressing step, the prepreg can be heat-pressed continuously without damage, which is more preferable. The tension from the weight of the prepreg is more preferably 0.02 N/cm or less, because in that case, a prepreg that is liable to pulling-off of carbon fibers can be heat-pressed continuously without damage. There are no specific limitations on the method to be used to eliminate the external tension on the prepreg, but useful ones include a method in which a prepreg is unwound while detecting the prepreg at the inlet of the heat-pressing apparatus using a laser sensor so that a constant slack is maintained, a method containing a step for heat-pressing by a pair of parallel heating plates during intermittent conveyance, wherein take-up devices designed for the intermittent conveyance are installed before and after the heating plates so that they work together simultaneously to nip and take up the prepreg to substantially eliminate the external tension applied to the potential rupturing point, and a method in which heat-pressing is performed using a double belt pressing apparatus or a roll pressing apparatus in combination with a cooling double pressing apparatus or roll pressing apparatus installed immediately before the heat-pressing apparatus to work together to substantially eliminate the external tension applied to the potential rupturing point. To carry out the heat-pressing of a prepreg of the carbon sheet according to the present invention, it is preferable to adopt a method that uses a pair of parallel heating plates to allow the prepreg to be heat-pressed while being conveyed intermittently because this enables the production of a highly smooth carbon sheet.

To produce the carbon sheet used in the gas diffusion electrode substrate according to the present invention, therefore, the process to be used preferably includes a step for heat-pressing (hereinafter referred to as heat-pressing step) of a continuous prepreg and the unwinding tension in the heat-pressing step is preferably 0.05 N/cm or less. In the heat-pressing step, furthermore, it is preferable for the prepreg to be heat-pressed between a pair of parallel heating plates while conveying it intermittently. As described later, a continuous prepreg as referred to herein has a length of 10 m or more.

<Carbonization>

For the present invention, a porous material such as paper-like carbon fiber substrate is impregnated with a resin composition to provide a prepreg, and the prepreg is then baked in an inert atmosphere to carbonize the resin composition. For this baking, a batch-type heating furnace or a continuous heating furnace can be used.

The maximum baking temperature is preferably in the range of 1,300° C. to 3,000° C. If the maximum temperature is 1,300° C. or more, carbonization of the resin component in the prepreg is facilitated to ensure the formation of a carbon sheet with high electrical conductivity and thermal conductivity. If the maximum temperature is 3,000° C. or less, on the other hand, the operating cost of the heating furnace can be reduced.

For the present invention, a product produced by impregnating a porous material such as paper-like carbon fiber substrate with a resin composition and then carbonized is occasionally referred to as baked carbon fiber material. Thus, the carbon sheet means a baked carbon fiber material, and both the baked carbon fiber material before receiving water repellent treatment and the baked carbon fiber after receiving water repellent treatment can be referred to as carbon sheets.

<Water Repellent Treatment>

For the present invention, it is preferable for the baked carbon fiber be subjected to water repellent treatment for the purpose of improving the water discharge performance. The water repellent treatment can be performed by coating the baked carbon fiber material with a water repellent material and subsequently heat-treating it. As a result of the water repellent treatment, a carbon sheet containing a water repellent material as a binding material can be obtained.

As the water repellent material, it is preferable to use a fluorine-based polymer because of high corrosion resistance. Examples of the fluorine-based polymer includes polytetrafluoroethylene (PTFE), tetrafluoroethylene-hexafluoropropylene copolymers (FEP), and tetrafluoroethylene-perfluoroalkylvinyl ether copolymers (PFA).

The coating amount of the water repellent material used for the water repellent treatment is preferably 1 to 50 parts by mass, more preferably 2 to 40 parts by mass, relative to 100 parts by mass of the baked carbon fiber material. If the coating amount of the water repellent material is 1 part by mass or more relative to 100 parts by mass of the baked carbon fiber, the resulting carbon sheet will have a high water discharge performance. If the coating amount of the water repellent material is 50 parts by mass or less relative to 100 parts by mass of the baked carbon fiber, on the other hand, the resulting carbon sheet will have a high electrical conductivity.

[Gas Diffusion Electrode Substrate]

The gas diffusion electrode substrate according to the present invention will be described below.

The gas diffusion electrode substrate according to the present invention preferably includes a carbon sheet having, at least on one surface thereof, a microporous layer containing at least an electrically conductive filler as described later, wherein the gas diffusion electrode substrate can be divided in the thickness direction into a smaller pore part and a larger pore part, the larger pore part being adjusted to a thickness of 3 to 60 μm.

The smaller pore part mentioned above is a region that contains a microporous layer and a microporous layer containing a carbon sheet. The larger pore part, on the other hand, is a region that contains a carbon sheet, but does not contain a microporous layer. This is due to the fact that a microporous layer contains many small sized pores whereas a carbon sheet contains many large sized pores, but a microporous layer containing a carbon sheet is regarded as a part containing many small sized pores because the large sized pores in the carbon sheet are annihilated by the microporous layer. In the case where the material of the microporous layer is partially adhered to carbon fibers in the carbon sheet, the layer forms a region containing substantially large sized pores and can be regarded as a larger pore part if the part with the adhered material can be regarded as a larger pore part based on the undermentioned thickness observation of the smaller pore part and larger pore part, because the larger pore part in the carbon sheet is not annihilated by the microporous layer.

In the gas diffusion electrode substrate according to the present invention, the larger pore part preferably has a thickness of 3 to 60 µm, more preferably 15 to 40 µm. Vapor of the generated water diffused from the catalyst layer into the gas diffusion electrode substrate during power generation mostly grow into droplets in the larger pore part to impair the gas diffusivity. If the thickness of the larger pore part is 60 µm or less, the droplets of the generated water in the larger pore part will be small, serving to prevent the power generation performance from decreasing, and this effect will be noticeable if it is 40 µm or less. If the thickness of the larger pore part is 3 µm or more, on the other hand, conveyance can be performed without damage to the microporous layer even if a conveying roller etc. comes in contact with the surface opposite to the microporous layer-carrying surface, and if it is 15 µm or more, conveyance can be continued without contact of the microporous layer with a conveying roller even if the gas diffusion electrode substrate is in a compressed state under pressure when a conveying roller comes in contact with the surface opposite to the microporous layer-carrying surface.

For the gas electrode substrate according to the present invention, the thickness ratio between the smaller pore part and the larger pore part is preferably 1:0.1 to 1:1.5, more preferably 1:0.1 to 1:1.0.

If the thickness ratio between the smaller pore part and the larger pore part is 1:0.1 or more, conveyance can be continued without contact of the microporous layer with a conveying roller even if the gas diffusion electrode substrate is in a compressed state under pressure.

If the thickness ratio between the smaller pore part and the larger pore part is 1:1.5 or less, on the other hand, a decrease in power generation performance can be prevented because droplets of the generated water in the carbon sheet are discharged into the separator without undergoing significant agglomeration, and this effect will be noticeable if it is 1:1.0 or less.

For the gas electrode substrate according to the present invention, the thickness is preferably 33 to 145 µm, more preferably 45 to 120 µm.

If the thickness is 33 µm or more, the gas diffusion electrode substrate will be easy to handle, and a thickness of 45 µm or more ensures improved spring properties for cushioning the swelling and shrinkage of the electrolyte membrane during power generation. If the thickness of the gas diffusion electrode substrate is 145 µm or less, the gas diffusivity in the thickness direction will be high to ensure improved power generation performance, and if it is 120 µm or less, the high electric current density region will work effectively to discharge the water generated in large amounts and serve to maintain the power generation performance.

<Formation of Microporous Layer>

The microporous layer, which is one of the constituent elements of the gas diffusion electrode substrate according to the present invention, will be described below.

There are no specific limitations on the areal weight of the microporous layer, but it is preferably in the range of 10 to 50 $g/m^2$, more preferably 30 $g/m^2$ or less, still more preferably 25 $g/m^2$ or less. On the other hand, the areal weight is preferably 14 $g/m^2$ or more, more preferably 16 $g/m^2$ or more.

If the areal weight of the microporous layer is 10 $g/m^2$ or more, one surface of the carbon sheet can be covered with the microporous layer, and back-diffusion of the generated water is further promoted to ensure more effective suppression of drying-up. If the areal weight of the microporous layer is 50 $g/m^2$ or less, the water discharge performance is further improved to ensure more effective suppression of flooding. Drying-up refers to the decrease in proton conductivity due to drying of the electrolyte membrane that results from water vapor diffusion when operation is performed at a relatively high temperature.

For the gas diffusion electrode substrate according to the present invention, the carbon sheet-free region in the smaller pore part preferably has a thickness of 10 to 40 µm. If the carbon sheet-free region in the smaller pore part has a thickness of 10 µm or more, it will be possible to prevent the short circuit current phenomenon that can results from carbon fibers in the carbon sheet breaking through the electrolyte membrane during power generation. If the carbon sheet-free region in the smaller pore part has a thickness of 40 µm or less, on the other hand, it will be possible to prevent the gas diffusivity from decreasing.

For the gas diffusion electrode substrate according to the present invention, the material of the microporous layer may be adhered to the carbon sheet because it ensures more efficient discharge of the generated water. It is more preferable that the material of the microporous layer be adhered to the entirety of the carbon fibers existing on the opposite surface of the gas diffusion electrode substrate to the microporous layer-carrying surface as long as they do not block large pores. In this case, if the opposite surface of the gas diffusion electrode substrate to the microporous layer-carrying surface faces the separator during power generation, droplets of the generated water discharged through the gas diffusion electrode substrate will be easily removed from the surface of the gas diffusion electrode substrate. Whether or not the material of the microporous layer is adhered to carbon fibers existing on the opposite surface of the gas diffusion electrode substrate to the microporous layer-carrying surface can be determined from the shape and components of the electrically conductive filler contained in the microporous layer.

For the present invention, it is preferable for the microporous layer to contain an electrically conductive filler. The electrically conductive filler is preferably a carbon powder. Examples of the carbon powder include carbon black materials such as furnace black, acetylene black, lamp black, and thermal black; graphite materials such as scaly graphite, scale-like graphite, earthy graphite, artificial graphite, expanded graphite, and flaky graphite; and others such as carbon nanotube, linear carbon, and milled carbon fiber. In particular, preferable carbon powder materials for the filler include carbon black materials, of which acetylene black is preferable because the impurity content is small.

For the present invention, it is preferable for the microporous layer to contain a water repellent material from the viewpoint of promoting the discharge of water. In particular, a fluorine-based polymer is preferably used as the water repellent material because of its high corrosion resistance. Examples of the fluorine-based polymer includes polytetrafluoroethylene (PTFE), tetrafluoroethylene-hexafluoropropylene copolymers (FEP), and tetrafluoroethylene-perfluoroalkylvinyl ether copolymers (PFA).

The microporous layer can be produced by coating at least one surface of the carbon sheet with an coating liquid containing the aforementioned filler (filler-containing coating liquid).

The filler-containing coating liquid may contain a dispersion medium such as water and organic solvent, and may also contain a dispersant such as surfactant. The dispersion medium is preferably water, and it is preferable to use a nonionic surfactant as dispersant. It may also contain an electrically conductive filler, selected from the various carbon powder materials, and a water repellent material as described above.

Coating of the carbon sheet with the filler-containing coating liquid can be performed using an appropriate coating apparatus selected from a variety of commercially available ones. Useful coating techniques include screen printing, rotary screen printing, spraying, intaglio printing, gravure printing, die coating, bar coating, and blade coating. The coating techniques listed above are intended only to show examples, and the invention is not limited thereto.

It is preferable to dry the filler-containing coating liquid at a temperature of 80° C. to 180° C. after coating the carbon sheet with the coating liquid. That is, the coated sheet is placed in a dryer having a temperature set to 80° C. to 180° C. and dried in the range of 5 to 30 minutes. The drying air supply rate may be appropriately set, but rapid drying may induce micro-cracks in the surface. It is preferable for the dried coated sheet to be placed in a muffle furnace, a baking furnace, or a high-temperature drying furnace, and heated preferably at a temperature of 300° C. to 380° C. for 5 to 20 minutes to melt the water repellent material, followed by forming a microporous layer using a binder preparing by mixing electric conductive fillers such as powdery carbon materials.

To examine the physical properties of the carbon sheet in the gas diffusion electrode substrate according to the present invention, the gas diffusion electrode substrate is first treated in an air atmosphere at 400° C. for 2 hours, subjected to ultrasonic washing in an alcohol such as methanol, and then air-dried, before performing the examination.

The gas diffusion electrode substrate according to the present invention is preferably in a continuous form. Furthermore, the gas diffusion electrode substrate according to the present invention is preferably in the form of a roll of a continuous gas diffusion electrode substrate. Here, the term "continuous" means "10 m or more long". There is no specific upper limit to the length, but it is preferably 1,000 m or less because the weight will increase excessively if the length is increased excessively. It is preferable for the carbon sheet and gas diffusion electrode substrate to be in continuous forms, because in that case, production of fuel cells therefrom can be performed in successive steps to ensure smaller production costs.

[Membrane Electrode Assembly]

For the present invention, a membrane electrode assembly can be formed by preparing a solid polymer electrolyte membrane having catalyst layers on both surfaces and bonding the aforementioned gas diffusion electrode substrate to at least one surface thereof. At this time, if the gas diffusion electrode substrate is disposed in such a manner that the microporous layer faces the catalyst layer, back-diffusion of the generated water will occur more easily and in addition, the area of contact between the catalyst layer and the gas diffusion electrode substrate will increase, leading to a decrease in contact electric resistance.

[Fuel Cell]

The fuel cell according to the present invention includes the gas diffusion electrode substrate according to the present invention. More specifically, the fuel cell according to the present invention includes the aforementioned membrane electrode assembly having separators on both sides thereof. That is, the fuel cell can be produced by arranging separators on both sides of the aforementioned membrane electrode assembly. Usually, a solid polymer electrolyte fuel cell is produced by laminating a plurality of such membrane electrode assemblies, each being sandwiched by separators with gaskets interposed therebetween. The catalyst layer includes a layer containing a solid polymer electrolyte and a catalyst-loaded carbon material. As the catalyst, platinum is usually used. In a fuel cell in which a carbon monoxide-containing reformed gas is supplied to the anode, it is preferable to use platinum and ruthenium as catalysts for the anode. As the solid polymer electrolyte, it is preferable to use a perfluorosulfonic acid-based polymer material that is high in protonic conductivity, oxidation resistance, and heat resistance. For fuel cell units and fuel cells, these structures themselves are well known.

EXAMPLES

The gas diffusion electrode substrate according to the present invention will be described in detail below with reference to examples. The materials, the methods for producing carbon sheet samples and gas diffusion electrode substrate samples, and the methods for evaluating the fuel cell performance that were used in the examples are described below.

<Preparation of Carbon Sheet>

Preparation of 95 μm Thick Carbon Sheet

Polyacrylonitrile-based carbon fiber "TORAYCA" (registered trademark) T300 (average monofilament diameter 7 μm) manufactured by Toray Industries, Inc. was cut to an average short fiber length of 12 mm, dispersed in water, and subjected to a continuous papermaking process using a wet papermaking method. Further, a 10% by mass aqueous solution of polyvinyl alcohol, used as binder, was spread over the paper-like material and then dried to prepare a paper-like carbon fiber substrate having a carbon fiber areal weight of 20.0 g/m². The coating amount of the polyvinyl alcohol was 22 parts by mass relative to 100 parts by mass of the paper-like carbon fiber substrate.

Next, a resin composition prepared by mixing a resol type phenolic resin and a novolak type phenolic resin at a mass ratio of 1:1, used as a thermosetting resin, scaly graphite (average particle size 5 μm), used as a carbon powder, and methanol as a solvent, were mixed at a thermosetting resin/carbon powder/solvent ratio of 10 parts by mass/5 parts by mass/85 parts by mass, and the resulting mixture was stirred for 1 minute using an ultrasonic dispersing apparatus to provide a uniformly dispersed resin composition.

Next, the continuous paper-like carbon fiber substrate was immersed continuously in an impregnating solution of the resin composition in a pan, and it was squeezed between rollers to ensure impregnation with the resin composition.

Subsequently, it was dried by heating at a temperature of 100° C. for 5 minutes to prepare a prepreg. Then, an unwinding and a winding device were installed before and after a heat-pressing apparatus equipped with heated heating plates designed to carry out heat-pressing between a pair of parallel heating plates while performing intermittent conveyance, and the prepreg was subjected to continuous heat-pressing treatment at a temperature 180° C. for a total period of 5 minutes. In the pressing step, a spacer was provided in the flat plate pressing apparatus and the gap between the upper and lower pressing plates was adjusted so as to provide a prepreg with a thickness of 105 µm after heat treatment. Here, the external tension was zero, and the unwinding tension applied to the prepreg was 0.005 N/cm, which was equal to the weight of the prepreg.

A substrate prepared by heat-treating the prepreg was introduced into a heating furnace maintaining a nitrogen gas atmosphere with a maximum temperature of 2,400° C. to provide a continuous carbon sheet of a baked carbon fiber material.

The carbon sheet prepared above was cut to 15 cm×12.5 cm, immersed in an aqueous dispersion liquid of a PTFE resin ("Polyflon" (registered trademark) PTFE Dispersion D-201C (manufactured by Daikin Industries, Ltd.)) or an aqueous dispersion liquid of a FEP resin ("Neoflon" (registered trademark) FEP Dispersion ND-110 (manufactured by Daikin Industries, Ltd.)) to impregnate the baked carbon fiber material with a water repellent material. Then, it was dried by heating in a drying furnace at a temperature of 100° C. for 5 minutes to provide a water repellent carbon sheet carrying a water repellent material adhered uniformly. For the drying step, the carbon sheet was placed vertically and turned upside down every 1 minute. The aqueous dispersion liquid of the water repellent material was diluted before use to an appropriate concentration so that the water repellent material would account for 5 parts by mass relative to 95 parts by mass of the carbon sheet after drying.

<Preparation of Gas Diffusion Electrode Substrate>

[Materials]

Carbon powder: acetylene black: "Denka Black" (registered trademark) manufactured by Denki Kagaku Kogyo Kabushiki Kaisha) 7.0 g Water repellent material: PTFE resin ("Polyflon" (registered trademark) PTFE Dispersion D-1E (manufactured by Daikin Industries, Ltd.), which is an aqueous dispersion liquid containing 60 parts by mass of PTFE resin) 2.5 g The weight is not of the aqueous dispersion liquid of the PTFE resin, but of the PTFE resin alone.

Surfactant "Triton" (registered trademark) X-100 (manufactured by Nacalai Tesque, Inc.) 14.0 g Purified water 75.8 g A filler-containing coating liquid was prepared by mixing the above materials using a disperser. One surface of the carbon sheet subjected to water repellent treatment was coated with the filler-containing coating liquid to form a film using a slit die coater, and heated first at a temperature of 120° C. for 10 minutes and then at a temperature of 380° C. for 10 minutes. In this way, a microporous layer was formed on the water repellent carbon sheet to provide a gas diffusion electrode substrate.

<Evaluation of Power Generation Characteristics>

A catalyst paste was prepared by sequentially adding 1.00 g of a platinum-loaded carbon catalyst (manufactured by Tanaka Kikinzoku Kogyo K.K., loaded platinum quantity 50% by mass), 1.00 g of purified water, 8.00 g of a "Nafion" (registered trademark) solution ("Nafion" (registered trademark), manufactured by Aldrich, 5.0% by mass), and 18.00 g of isopropyl alcohol (manufactured by Nacalai Tesque, Inc.).

Then, a tape of "Nafion" (registered trademark) PTFE ("Tombo" (registered trademark) No. 9001, manufactured by NICHIAS Corporation) cut to a size of 5 cm×5 cm was coated with the catalyst paste using a spray and dried at normal temperature to prepare a PTFE sheet provided with a catalyst layer containing platinum at 0.3 mg/cm². Then, a solid polymer electrolyte film ("Nafion" (registered trademark) NRE-211cs, manufactured by DuPont) cut to 8 cm×8 cm was sandwiched between two catalyst layer-covered PTFE sheets and heat-pressed at a temperature of 130° C. for 5 minutes under a pressure of 5 MPa in a flat plate pressing apparatus to transfer the catalyst layers to the solid polymer electrolyte film. After the pressing step, the PTFE sheets were removed to provide a catalyst layer-covered solid polymer electrolyte membrane.

Next, the catalyst layer-covered solid polymer electrolyte membrane was sandwiched between two gas diffusion electrode substrates cut to a size of 5 cm×5 cm and pressed at a temperature of 130° C. for 5 minutes under a pressure of 3 MPa using a flat plate pressing apparatus, thereby providing a membrane electrode assembly. It is noted here that the gas diffusion electrode substrate was disposed in such a manner that the surface having a microporous layer was in contact with the catalyst layer.

The resulting membrane electrode assembly was incorporated into a fuel cell evaluation unit cell to measure the changes in voltage with the current density. Here, the separator used was a parallel flow channel type one in which both the groove width and the rib width were 0.6 mm. Further, the evaluation was carried out with non-pressurized hydrogen and non-pressurized air being supplied to the anode side and the cathode side, respectively.

For examining the anti-flooding characteristic, humidification was performed using a humidifying pot in which both hydrogen and air were adjusted to a temperature of 40° C. The humidity at this time was 100%. The utilization rates of hydrogen and atmospheric oxygen were set to 70 mol % and 40 mol %, respectively. The output voltage at a current density of 2.0 A/cm² was measured and used as an indicator of anti-flooding characteristic.

<Measurement of Areal Weight>

The areal weight values of the carbon sheet and the gas diffusion electrode substrate were determined from the mass of a 10 cm square sample divided by the area (0.01 m²) of the sample.

<Thickness Measurement of Carbon Sheet and Gas Diffusion Electrode Substrate>

A sample of the carbon sheet or gas diffusion electrode substrate was placed on a smooth surface plate and the height was measured while applying a pressure of 0.15 MPa and the difference in the total height between before and after placing the sample (carbon sheet or gas diffusion electrode substrate) was determined. Measurements were taken at 10 different positions and the height difference measurements were averaged to provide a value to be adopted as the thickness of the gas diffusion electrode substrate.

<Evaluation of Gas Permeation Resistance>

Air was injected to penetrate the carbon sheet in the thickness direction at a rate of 14 cm³/cm²/sec and the gas permeation resistance of the carbon sheet was evaluated based on the pressure difference.

<Measurement of Tensile Characteristics (Tensile Strength and Elongation Percentage) of Carbon Sheet>

Tensile characteristics of the carbon sheet were examined using Autograph (registered trademark) AGS-X (manufactured by Shimadzu Corporation) in the tensile test mode. A 15 cm×1.5 cm sample cut out of the carbon sheet was attached to the two (upper and lower) clamps fixed 60.0 cm apart on the tensile tester and the carbon sheet sample was pulled at a speed of 10 mm/min until it was broken to provide a stress-displacement curve. The maximum stress on this curve was adopted as the tensile strength of the carbon sheet (N/cm) and the displacement at the point was divided by the initial length (60.0 mm) of the carbon sheet sample and multiplied by 100 to calculate the elongation percentage, which was adopted as the elongation percentage (%) at the maximum tensile strength. Five measurements were taken and averaged to provide a value to use.

<Measuring Methods for Total Area of Through-Pores in Carbon Sheet and Number of Through-Pores with Diameter of 25 μm or More>

To determine the area and number of through-pores in a carbon sheet sample, the surface of the carbon sheet sample was observed and photographed by optical microscopy at a magnification of 50 times. Transmitted illumination was used for taking photographs. Using a "J-trim" image processing program, the image obtained was scanned in 256 stages of luminance between the maximum and the minimum lightness, and the data were binarized with the 128th gray scale stage from the minimum used as threshold. The ratio of the area of the lighter portions of the binarized image to the total area was adopted to represent the total area of the through-pores.

Furthermore, the number of the through-pores in the carbon sheet sample and the area of each through-pore were calculated automatically from this image by executing the "Analyze particle" particle analysis command of the "ImageJ" image processing program.

For all photographs, Leica M205C or an equivalent optical microscope was used to take 25 measurements for each sample under the following conditions: exposure 20 ms, gain 1.0, gamma 1.0, transmitted light, illumination 50%, and aperture fully open.

<Measuring Method for Thickness of Smaller Pore Part and Larger Pore Part>

The method used for measuring the thickness of the smaller pore part and the larger pore part is described below with reference to the FIGURE. First, a cross section of a gas diffusion electrode substrate compressed to the thickness at 0.15 MPa was photographed by scanning electron microscopy. Using an ion milling device, ten samples were prepared for observation of randomly selected thickness-directional cross sections of the gas diffusion electrode substrate. Then, the gas diffusion electrode substrate was compressed to the thickness at 0.15 MPa and placed between parallel metal plate jigs and an image of a compressed cross section was taken at a magnification of 200 times by scanning electron microscopy.

In the image obtained, the surface of the microporous layer (2) in the gas diffusion electrode substrate (1) is defined as the thickness measurement start point (3), and a line perpendicular to the gas diffusion electrode substrate is drawn from here. The intersection of the perpendicular line and a void in the larger pore part in the carbon sheet is defined as the end point (4) of the smaller pore part, and the distance between the points (3) and (4) is defined as the thickness of the smaller pore part (5) (at the thickness measuring position). Here, a region where carbon fibers of the carbon sheet are contained in or in contact with the material of the microporous layer is regarded as being included in the smaller pore part even if it is within the carbon sheet, because the pore size in the region is not large. Then, the intersection of the perpendicular line and the surface of the opposite side to the microporous layer side of the gas electrode substrate is defined as the thickness measurement end point (6), and the distance between the points (4) and (6) was determined as the thickness of the larger pore part (7) (at the thickness measuring position). In an image of a cross section photographed at a magnification of 200 times, such measurements were taken at five positions and such a set of measurements was taken from 10 samples prepared for cross section observation, thus providing a total of 50 thickness measurements for the smaller pore part and the larger pore part, which were then averaged to provide values representing the thickness of the smaller pore part and that of the larger pore part in the gas diffusion electrode substrate.

SU8010, manufactured by Hitachi High-Technologies Corporation, or an equivalent apparatus was used for scanning electron microscopy while IM4000, manufactured by Hitachi High-Technologies Corporation, or an equivalent ion milling apparatus was used for preparing samples for cross section observation.

<Measuring Method for Thickness of Carbon Sheet-Free Smaller Pore Part>

To determine the thickness of carbon sheet-free smaller pore part, a cross section of the gas diffusion electrode substrate compressed to the thickness at 0.15 MPa was photographed by scanning electron microscopy. Using an ion milling device, 50 samples were prepared for observation of randomly selected thickness-directional cross sections of the gas diffusion electrode substrate. Then, the gas diffusion electrode substrate was compressed to the thickness at 0.15 MPa and placed between parallel metal plate jigs and an image of a compressed cross section was taken at a magnification of 200 times by scanning electron microscopy.

In the image obtained, the distance between the surface of the microporous layer in the smaller pore part of the gas diffusion electrode substrate and the nearest carbon fiber surface to that surface was determined as the thickness of the carbon sheet-free smaller pore part. Such determination was performed for 50 samples prepared for cross section observation and the average of the measurements was adopted to represent the thickness of the carbon sheet-free smaller pore part of the gas diffusion electrode substrate.

SU8010, manufactured by Hitachi High-Technologies Corporation, or an equivalent apparatus was used for scanning electron microscopy while IM4000, manufactured by Hitachi High-Technologies Corporation, or an equivalent ion milling apparatus was used for preparing samples for cross section observation.

<Examination of Existence of Microporous Layer Component Adhered to Carbon Fibers Existing at Opposite Surface to Microporous Layer-Carrying Surface>

Existence or absence of a microporous layer component adhered to carbon fibers existing at the opposite surface to the microporous layer-carrying surface was decided based on observations made by a scanning electron microscope and an EDX accessory.

First, a sample was randomly cut out of the gas diffusion electrode substrate, and an image of carbon fibers at the opposite surface to the microporous layer-carrying surface was taken by scanning electron microscopy at a magnification of 400 times. Then, the characteristic X-ray detected at the same position was analyzed by EDX to determine the peaks associated with major components (such as carbon and fluorine) of the microporous layer. The microporous layer-carrying surface was also observed by the same procedure, and in the case where shape features (particle diameter and aspect ratio) and the constitution of a component of the microporous layer were detected, it was decided that there existed a microporous layer component adhered to carbon fibers existing at the opposite surface to the microporous layer-carrying surface. Existence or absence of a microporous layer component adhered inside the larger pore part was also decided based on observation of cross sections of the gas electrode diffusion layer.

SU8010, manufactured by Hitachi High-Technologies Corporation, or an equivalent apparatus was used for scanning electron microscopy, and EMAX Evolution X-MAX (150 mm²), manufactured by HORIBA, Ltd., or an equivalent apparatus was used for EDX observation, which was performed at an accelerating voltage of 7 kV.

Example 1

According to the methods described in sections <Preparation of carbon sheet>, <Water repellent treatment>, and <Preparation of gas diffusion electrode substrate>, a gas diffusion electrode substrate including a 95 µm thick porous carbon sheet as shown in Table was produced. Results are shown in Table 1. This gas diffusion electrode substrate had a high power generation characteristic value of 0.15 V or more, a tensile strength of 15 N/cm or more, and an excellent elongation percentage at maximum tensile strength of 3% or less, showing that both good power generation characteristics and mechanical characteristics were realized.

Example 2

According to the methods described in sections <Preparation of carbon sheet>, <Water repellent treatment>, and <Preparation of gas diffusion electrode substrate>, a gas diffusion electrode substrate including a 60 µm thick porous carbon sheet as shown in Table was produced. In this case, the procedure was modified from Example 1 to decrease the quantities of the carbon fibers and adhered resin composition and accordingly decrease the heat-pressing thickness of the prepreg. In the microporous layer formation step, the quantity of the dispersing agent for the filler-containing coating liquid was increased from Example 1 to increase the viscosity of the filler-containing coating liquid to be used for coating. This gas diffusion electrode substrate had a very high power generation characteristic value of 0.20 V or more, a tensile strength of 15 N/cm or more, and an excellent elongation percentage at maximum tensile strength of 3% or less, showing that both good power generation characteristics and mechanical characteristics were realized.

Example 3

According to the methods described in sections <Preparation of carbon sheet>, <Water repellent treatment>, and <Preparation of gas diffusion electrode substrate>, a gas diffusion electrode substrate including a 30 µm thick porous carbon sheet as shown in Table was produced. In this case, the procedure was modified from Example 1 to decrease the quantities of the carbon fibers and adhered resin composition and accordingly decrease the heat-pressing thickness of the prepreg. In the microporous layer formation step, the quantity of the dispersing agent for the filler-containing coating liquid was increased from Example 2 to increase the viscosity of the filler-containing coating liquid to be used for coating. This gas diffusion electrode substrate had a very high power generation characteristic value of 0.20 V or more, a tensile strength of 10 N/cm or more, and a good elongation percentage at maximum tensile strength of 3% or less, showing that both good power generation characteristics and mechanical characteristics were realized.

Example 4

Long fibers of polyacrylonitrile were spun and hydroentangled to prepare a nonwoven fabric, which was then roll-pressed, subjected to flameproofing treatment at a temperature of 150° C. for 10 minutes, and sent to a heating furnace at a temperature of 2,400° C. to provide a carbon sheet with a thickness of 93 µm formed of a calcined nonwoven carbon fiber fabric. The solid contents of acetylene black and PTFE resin, mixed at 1:1 by mass to work as binder (water repellent material), were dispersed in water together with a dispersant to prepare an impregnating liquid. The flameproofed nonwoven fabric was impregnated with this impregnating liquid and heated in a heating furnace at a temperature of 380° C. for 10 minutes. As a result, a water repellent carbon sheet containing a binder at a solid content of 5 mass % to bond fibers was obtained. This gas diffusion electrode substrate had a high power generation characteristic value of 0.15 V or more and a high tensile strength of 10 N/cm or more, showing that both good power generation characteristics and mechanical characteristics were realized.

Example 5

According to the methods described in sections <Preparation of carbon sheet>, <Water repellent treatment>, and <Preparation of gas diffusion electrode substrate>, a gas diffusion electrode substrate including a 95 µm thick porous carbon sheet as shown in Table was produced. In doing this, the microporous layer was formed by applying the filler-containing coating liquid in two steps so that the sintered microporous layer would have a areal weight of 10 g/m² (first step) and 4 g/m² (second step). In the filler-containing coating liquid application step for a areal weight of 10 g/m², the distance between the die nozzle and the carbon sheet was reduced as compared to the application step in Example 1. Results are shown in Table 1. This gas diffusion electrode substrate had a high power generation characteristic value of 0.15 V or more, a tensile strength of 15 N/cm or more, and an excellent elongation percentage at maximum tensile strength of 3% or less, showing that both good power generation characteristics and mechanical characteristics were realized.

Example 6

According to the methods described in sections <Preparation of carbon sheet>, <Water repellent treatment>, and <Preparation of gas diffusion electrode substrate>, a gas diffusion electrode substrate including a 60 µm thick porous carbon sheet as shown in Table was produced. In doing this, the microporous layer was formed by applying the filler-containing coating liquid in two steps so that the sintered microporous layer would have a areal weight of 10 g/m² (first step) and 4 g/m² (second step). In the filler-containing coating liquid application step for a areal weight of 10 g/m², the distance between the die nozzle and the carbon sheet was reduced as compared to the application step in Example 2.

Results are shown in Table 1. This gas diffusion electrode substrate had a very high power generation characteristic value of 0.20 V or more, a tensile strength of 15 N/cm or more, and an excellent elongation percentage at maximum tensile strength of 3% or less, showing that both good power generation characteristics and mechanical characteristics were realized.

Example 7

According to the methods described in sections <Preparation of carbon sheet>, <Water repellent treatment>, and <Preparation of gas diffusion electrode substrate>, a gas diffusion electrode substrate including a 30 µm thick porous carbon sheet as shown in Table was produced. In doing this, the microporous layer was formed by applying the filler-containing coating liquid in two steps so that the sintered microporous layer would have a areal weight of 10 g/m$^2$ (first step) and 4 g/m$^2$ (second step). In the filler-containing coating liquid application step for a areal weight of 10 g/m$^2$, the distance between the die nozzle and the carbon sheet was reduced as compared to the application step in Example 3. Results are shown in Table 2. This gas diffusion electrode substrate had a very high power generation characteristic value of 0.20 V or more, a tensile strength of 10 N/cm or more, and a good elongation percentage at maximum tensile strength of 3% or less, showing that both good power generation characteristics and mechanical characteristics were realized.

Comparative Example 1

According to the methods described in sections <Preparation of carbon sheet>, <Water repellent treatment>, and <Preparation of gas diffusion electrode substrate>, a gas diffusion electrode substrate including a 140 µm thick porous carbon sheet as shown in Table was produced. In this case, the procedure was modified from Example 1 to increase the quantities of the carbon fibers and adhered resin composition and accordingly increase the heat-pressing thickness of the prepreg. This gas diffusion electrode substrate had very good characteristics including a tensile strength of 15 N/cm or more and an elongation percentage at maximum tensile strength of 3% or less, but its power generation characteristic value was very low.

Comparative Example 2

According to the methods described in sections <Preparation of carbon sheet>, <Water repellent treatment>, and <Preparation of gas diffusion electrode substrate>, a gas diffusion electrode substrate including a 103 µm thick porous carbon sheet as shown in Table was produced. In this case, the procedure was modified from Example 1 to increase the quantities of the carbon fibers and adhered resin composition and accordingly increase the heat-pressing thickness of the prepreg. This gas diffusion electrode substrate had very good characteristics including a tensile strength of 15 N/cm or more and an elongation percentage at maximum tensile strength of 3% or less, but its power generation characteristic value was not sufficiently high.

Comparative Example 3

In a heat-pressing step as used in Example 1, an external tension of 0.1 N/cm was applied by the unwinding device during the heat-pressing treatment. As a result, the prepreg roll was broken, making it impossible to obtain a continuous carbon sheet. Such breakage also occurred when the external tension was decreased to below 0.1 N/cm, and it was impossible to obtain a continuous carbon sheet.

Comparative Example 4

In a heat-pressing step as used in Example 2, an external tension of 0.1 N/cm was applied by the unwinding device during the heat-pressing treatment. As a result, the prepreg roll was broken, making it impossible to obtain a continuous carbon sheet. Such breakage also occurred when the external tension was decreased to below 0.1 N/cm, and it was impossible to obtain a continuous carbon sheet.

Comparative Example 5

In a heat-pressing step as used in Example 3, an external tension of 0.1 N/cm was applied by the unwinding device during the heat-pressing treatment. As a result, the prepreg roll was broken, making it impossible to obtain a continuous carbon sheet. Such breakage also occurred when the external tension was decreased to below 0.1 N/cm, and it was impossible to obtain a continuous carbon sheet.

TABLE 1

| | | Example 1 | Example 2 | Example 3 | Example 4 | Example 5 | Example 6 |
|---|---|---|---|---|---|---|---|
| Carbon sheet | thickness [µm] | 95 | 60 | 30 | 93 | 95 | 60 |
| | areal weight [g/m$^2$] | 37.9 | 24.2 | 12.1 | 23.8 | 37.9 | 24.2 |
| | gas permeation resistance [Pa] | 8.7 | 6.1 | 3.4 | 8.1 | 8.7 | 6.1 |
| | tensile strength [N/cm] | 28 | 23 | 11 | 17 | 28 | 23 |
| | elongation percentage at maximum tensile strength [%] | 0.5 | 0.6 | 0.9 | 17 | 0.5 | 0.6 |
| | pore area [%] | 9 | 16 | 28 | 7 | 9 | 16 |
| | number of 25 µm pores [pores/cm$^2$] | 7 | 19 | 53 | 1 | 7 | 19 |
| | damage to prepreg during heat-pressing | none | none | none | none | none | none |
| Microporous layer | areal weight [g/m$^2$] | 14.0 | 14.0 | 14.0 | 14.0 | 14.0 | 14.0 |
| | number of 200 µm pores [pores/cm$^2$] | 3 | 7 | 8 | 0.4 | 0.8 | 1.1 |
| Gas diffusion electrode substrate | areal weight [g/m$^2$] | 51.9 | 38.2 | 26.1 | 37.8 | 51.9 | 38.2 |
| | thickness [µm] | 108 | 81 | 55 | 105 | 105 | 76 |
| | thickness of smaller pore part [µm] | 48 | 49 | 47 | 48 | 47 | 49 |
| | thickness of larger pore part [µm] | 60 | 32 | 8 | 57 | 58 | 27 |
| | tensile strength [N/cm] | 30 | 26 | 14 | 19 | 30 | 25 |
| | elongation percentage at maximum tensile strength [%] | 0.4 | 0.6 | 0.8 | 14 | 0.4 | 0.6 |

TABLE 1-continued

| | | Example 7 | Comparative example 1 | Comparative example 2 | Comparative example 3 | Comparative example 4 | Comparative example 5 |
|---|---|---|---|---|---|---|---|
| Power generation characteristics | output voltage [V], (operation conditions 40° C., humidification temperature 40° C., humidity 100%, electric current density 2.0 A/cm$^2$) | 0.17 | 0.26 | 0.29 | 0.15 | 0.16 | 0.25 |
| Carbon sheet | thickness [μm] | 30 | 140 | 103 | 95 | 60 | 30 |
| | areal weight [g/m$^2$] | 12.1 | 55.7 | 41.0 | 37.9 | 24.2 | 12.1 |
| | gas permeation resistance [Pa] | 3.4 | 34 | 9.4 | — | — | — |
| | tensile strength [N/cm] | 11 | 64 | 34 | — | — | — |
| | elongation percentage at maximum tensile strength [%] | 0.9 | 0.2 | 0.4 | — | — | — |
| | pore area [%] | 28 | 1 | 4 | — | — | — |
| | number of 25 μm pores [pores/cm$^2$] | 53 | 0 | 2 | — | — | — |
| | damage to prepreg during heat-pressing | none | none | none | found | found | found |
| Microporous layer | areal weight [g/m$^2$] | 14.0 | 14.0 | 14.0 | — | — | — |
| | number of 200 μm pores [pores/cm$^2$] | 1.7 | 0.2 | 1.8 | — | — | — |
| Gas diffusion electrode substrate | areal weight [g/m$^2$] | 26.1 | 69.7 | 55.0 | — | — | — |
| | thickness [μm] | 51 | 156 | 117 | — | — | — |
| | thickness of smaller pore part [μm] | 48 | 49 | 47 | — | — | — |
| | thickness of larger pore part [μm] | 3 | 107 | 70 | — | — | — |
| | tensile strength [N/cm] | 14 | 66 | 35 | — | — | — |
| | elongation percentage at maximum tensile strength [%] | 0.8 | 0.2 | 0.4 | — | — | — |
| Power generation characteristics | output voltage [V], (operation conditions 40° C., humidification temperature 40° C., humidity 100%, electric current density 2.0 A/cm$^2$) | 0.28 | 0.11 | 0.14 | — | — | — |

In Tables, the pore area means the proportion of the total area of through-pores to the area of the carbon sheet. The number of 25 μm pores means the number of through-pores with a pore size of 25 μm or more.

EXPLANATION OF NUMERALS

1: Gas diffusion electrode substrate
2: Microporous layer
3: Thickness measurement start point
4: Light-dark boundary point at thickness measuring position
5: Thickness of smaller pore part at thickness measuring position
6: Thickness measurement end point
7: Thickness of larger pore part at thickness measuring position
8: Carbon sheet

The invention claimed is:

1. A porous carbon sheet comprising carbon fibers and in carbon paper form, wherein the porous carbon sheet has a thickness of 30 μm to 95 μm under a pressure of 0.15 MPa, an areal weight of 38 g/m$^2$ or less, a resistance to gas permeation of 0.5 Pa to 8.8 Pa, and a tensile strength of 5 N/cm to 50 N/cm,
wherein a total area of through-pores accounts for 7% to 40% of a total area of the porous carbon sheet, and
wherein the porous carbon sheet has an elongation percentage (%) at maximum tensile strength of 3% or less.

2. The porous carbon sheet as set forth in claim 1, wherein through-pores with a pore size of 25 μm or more exist at a rate of 5 pores/mm$^2$ or more.

3. The porous carbon sheet as set forth in claim 1 that, wherein the porous carbon sheet is in a continuous form.

4. A method for producing the porous carbon sheet as set forth in claim 3, comprising a step of heat-pressing a continuous prepreg,
the step of heat-pressing being performed at an unwinding tension of 0.05 N/cm or less.

5. A gas diffusion electrode substrate comprising the porous carbon sheet as set forth in claim 1, at least one surface thereof having a microporous layer containing at least an electric conductive filler.

6. A fuel cell comprising a gas diffusion electrode substrate as set forth in claim 5.

7. The porous carbon sheet as set forth in claim 1, wherein a total area of through-pores accounts for 14% to 40% of a total area of the porous carbon sheet.

8. The porous carbon sheet as set forth in claim 7, wherein the carbon fibers in the porous carbon sheet have an average monofilament length of 20 mm or less.

9. The porous carbon sheet as set forth in claim 1, wherein the carbon fibers in the porous carbon sheet have an average monofilament length of 20 mm or less.

10. A gas diffusion electrode substrate comprising the porous carbon sheet as set forth in claim 1, at least one surface thereof having a microporous layer containing at least an electric conductive filler,
the gas diffusion electrode substrate being dividable in the thickness direction into a smaller pore part and a larger pore part, the larger pore part having a thickness of 3 μm to 60 μm.

11. The gas diffusion electrode substrate as set forth in claim 7, wherein the thickness ratio between the smaller pore part and the larger pore part 1:0.1 to 1:1.5.

12. The gas diffusion electrode substrate as set forth in claim 7, wherein the thickness ratio between the smaller pore part and the larger pore part being is 1:0.1 to 1:1.0.

13. The gas diffusion electrode substrate as set forth in claim 7 having a thickness of 33 μm to 145 μm.

14. The gas diffusion electrode substrate as set forth in claim 7, wherein the porous carbon sheet contains through-pores with a pore size of 25 pm or more at a rate of 5 pores/mm² or more.

\* \* \* \* \*